April 22, 1924.
H. O. SCRANTON
CANE STRIPPING MACHINE
Filed Jan. 19, 1923
1,491,070
2 Sheets-Sheet 1
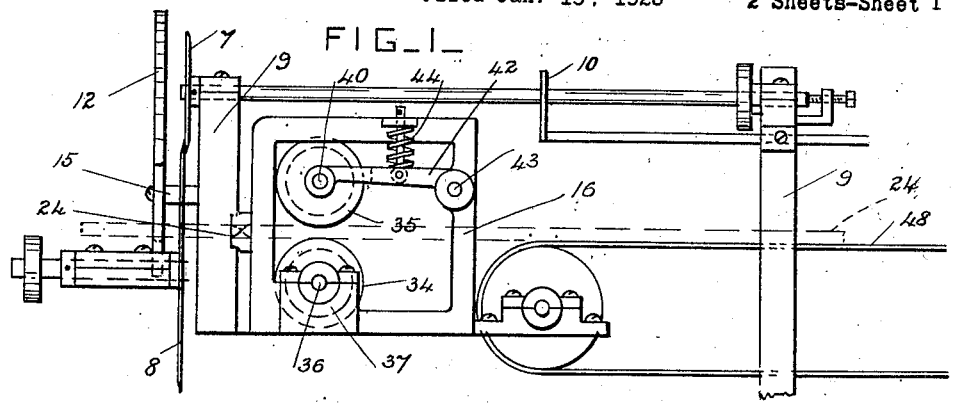
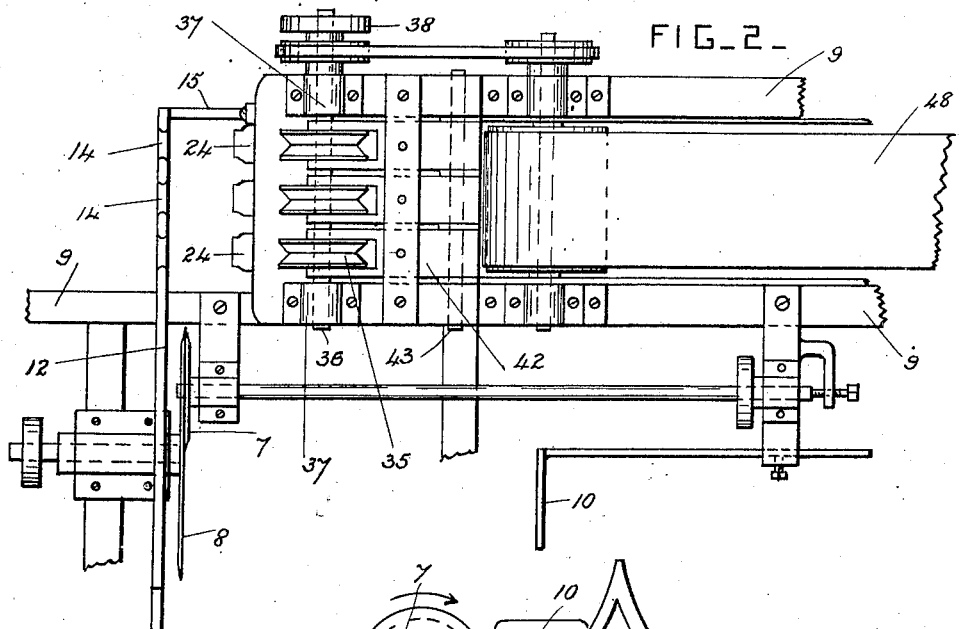
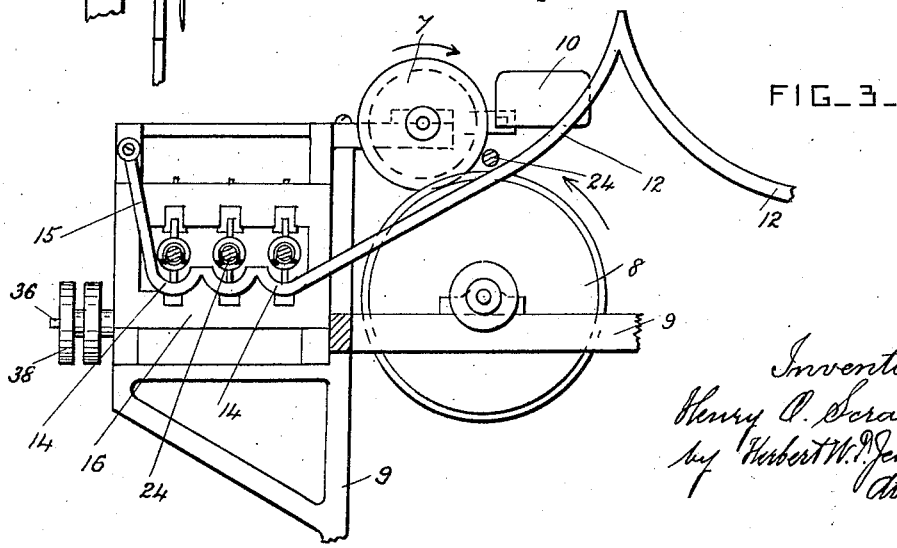
Inventor
Henry O. Scranton
by Herbert W. Jenner
Attorney.

April 22, 1924.
H. O. SCRANTON
CANE STRIPPING MACHINE
Filed Jan. 19, 1923     2 Sheets-Sheet 2
1,491,070
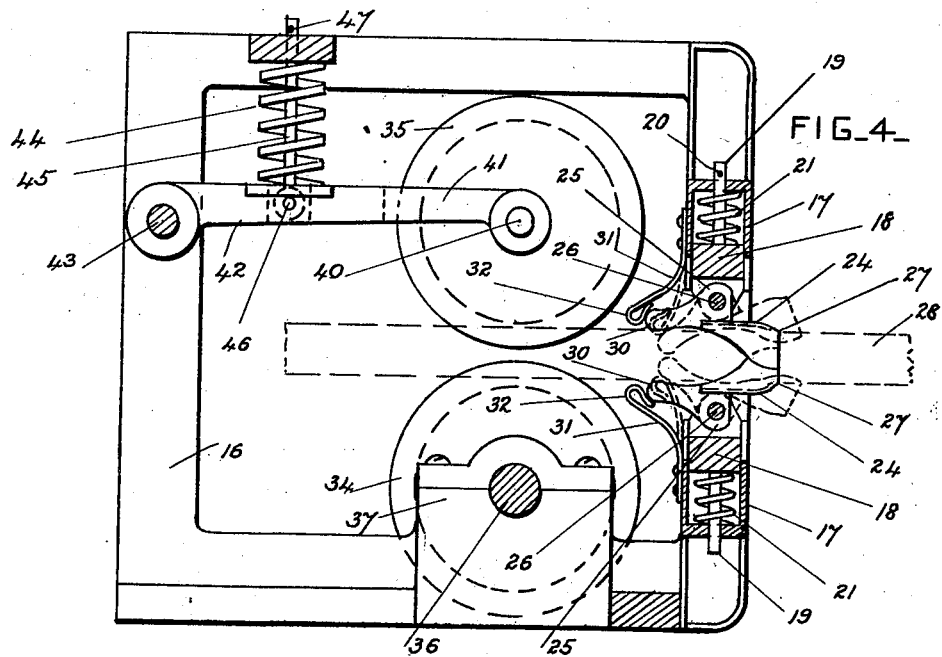
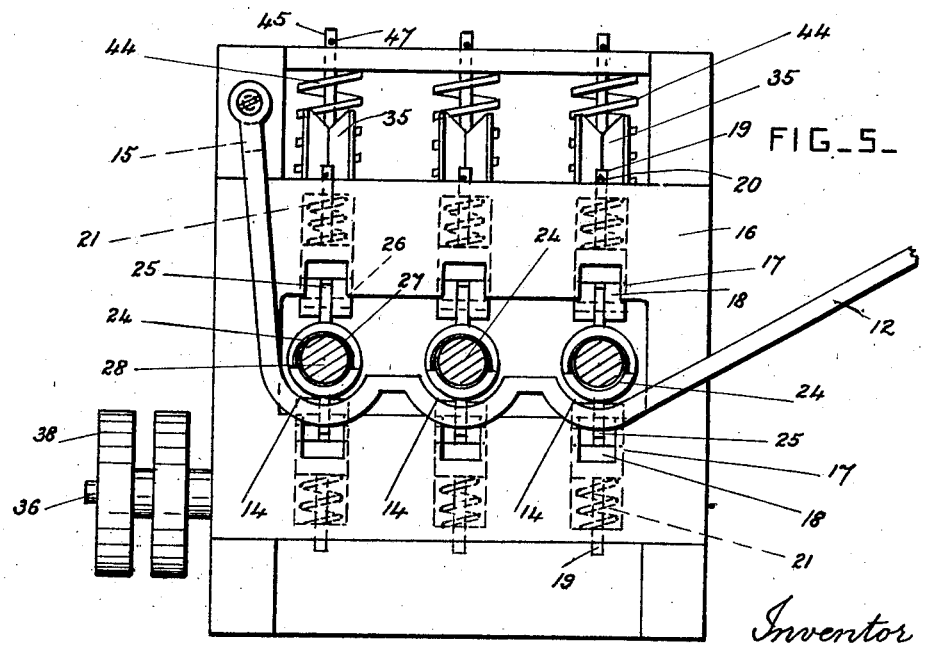
Inventor
Henry O. Scranton
by Herbert W. T. Jenner,
Attorney Patented Apr. 22, 1924.

1,491,070

UNITED STATES PATENT OFFICE.

HENRY O. SCRANTON, OF JEANERETTE, LOUISIANA.

CANE-STRIPPING MACHINE.

Application filed January 19, 1923. Serial No. 813,698.

*To all whom it may concern:*

Be it known that I, HENRY O. SCRANTON, a citizen of the United States, residing at Jeanerette, in the parish of Iberia and State of Louisiana, have invented certain new and useful Improvements in Cane-Stripping Machines, of which the following is a specification.

This invention relates to machines specially adapted for stripping the leaves from sugar canes after the tops have been cut off; and it consists in the novel construction and combination of the parts, whereby the canes are guided to the stripping cutters, and whereby the cutters are supported and operated, as hereinafter fully described and claimed.

In the drawings, Figure 1 is a side view of the principal portions of a stripping machine constructed according to this invention. Fig. 2 is a plan view of the same. Fig. 3 is a front end view of the machine. Fig. 4 is a detail side view of the stripping mechanism, partially in section and drawn to a larger scale. Fig. 5 is a front view of the parts shown in Fig. 4.

Two similar stripping machines formed right and left are preferably provided, and are secured one at each side of a portable cane harvesting machine of approved construction. The topping mechanism for the canes is also provided in duplicate. As the harvesting machine is moved along it cuts down the canes, and the canes fall over rearwardly and are seized by the operators, who stand on platforms, one at each side of the harvesting machine, and who deliver or guide the canes first to one or the other of the two topping devices, and thence to the stripping machines pertaining to the respective topping devices.

Any approved topping device may be used, but two circular cutters 7 and 8 are preferably provided, and are revolved in the direction of the arrows adjacent to them on the drawings, by any approved driving devices. These cutters are secured on shafts journaled in bearings on the frame 9, which supports the stripping devices, and which is a portion of the frame of the harvesting machine. An adjustable gage plate 10 is also supported from the frame at a suitable distance to the rear of the cutters. The operator guides the upper end portion of each cane, as it falls from the harvesting cutters, so that it bears against the gage plate and is topped by the cutters. The cutters are revolved continuously, at the same peripheral speed, and the canes are topped one after another as fast as they can be fed to the cutters.

A guide bar 12 is arranged in an inclined position to guide the canes laterally of the line of draft of the harvesting machine, and permit them to be delivered to the stripping devices. This guide bar has a horizontal row of concave guide notches or corrugations 14 at its lower end, one notch being provided for each pair of stripping blades. The machine shown has three pairs of stripping blades, and as they are all alike the description will be confined to one pair. One pair of topping cutters is sufficient to supply canes for three pairs of stripping blades. The guide bar 12 is secured at a predetermined distance in front of the stripping blades by a forwardly projecting arm 15 at its lower end, and it extends upwardly parallel to the front ends of the stripping blades to a point above the level of the upper cutter, where it joins onto the upper end of the similar guide bar of the other stripping machine, the two bars being secured by their two similar arms 15 which are bolted to the frame.

The upper end portion of the cane, after being topped, slides or rolls down the guide bar, and is dropped by the operator into one of the concave guide notches 14.

The operator then slides the cane rearwardly into the stripping devices. A housing 16 is secured to the frame 9 and has upper and lower guides 17 arranged in the same vertical plane with each concave guide notch. Upper and lower blocks 18 are slidable in the guides 17, and have stems 19 which project through holes in the top and bottom portions of the housing. The stems of the upper blocks have pins 20, or other suitable stops, which limit their downward movement. Helical springs 21 are arranged around the stems behind the blocks 18, and operate to press them towards each other.

Curved upper and lower stripping blades 24 are provided, and have lugs 25 which project laterally from their rear end portions, and these lugs are pivoted by pins 26 to the upper and lower slidable blocks 18. Cutting edges 27 are formed on the front ends of the blades 24, and their front portions are offset inwardly towards the axes of the blades. The sides of the offset portions overlap each other as shown in Fig. 4 in full lines, which show the blades in the act of stripping a cane 28.

The rear end portions of the blades are provided with lugs 30 having rounded ends, and these lugs project rearwardly of the pivot pins 26. Springs 31 are secured to the housing at one end, and have curved free end portions 32 which engage with the rounded ends of the lugs 30. When there is no cane between the blades, the blades are held apart by the springs 31, as indicated by the dotted lines in Fig. 4, so that the blades are inclined at an angle to each other, and form an open converging passage into which the upper end of a cane can easily be thrust.

When the cane strikes the lugs 30, it turns the blades on their pivot pins 26, and causes the sharp edges 27 to engage the cane, as shown in full lines in Fig. 4.

The cane is dragged between the blades by rollers 34 and 35 arranged one above another and preferably grooved so as to engage the cane. The lower rollers 34 are secured on a shaft 36 which is journaled in bearings 37 on the housing, and driven continuously by any suitable means, such as a pulley 38. The upper rollers 35 are journaled on pins 40 in the forked ends 41 of arms 42, which are pivoted to the housing by pins 43. Springs 44 are provided for pressing the upper rollers towards the lower rollers. These springs are preferably helical springs arranged around pins 45 which are pivoted to the arms by pins 46, and which project through holes in the housing, and have stops 47 which limit their downward movement. The springs 44 are arranged between the arms and the top of the housing. The rollers engage with the canes as they project from the blades, and drag them rearwardly through and between the blades so that all the leaves on the canes are stripped off by the sharp cutting edges 27. The lower end portions of the canes are larger than their upper end portions, and as the canes pass between the blades, the blades are moved apart against the pressure of the springs 21 which bear on the slidable blocks 18. These springs 21 also permit the blades to operate satisfactorily on canes of different size. The rollers discharge the stripped canes onto a conveyer belt 48 arranged to the rear of the housing, or into any suitable receptacle. The operator can let go of a cane as soon as it is gripped by the rollers, and push another cane into place.

What I claim is:

1. In a stripping machine, a stripping device, cutting mechanism for topping the canes arranged to one side of and above the level of the stripping device, and an inclined bar for guiding the canes laterally into and through the cutting mechanism and thence downwardly to a position in line with the stripping device.

2. In a stripping machine, a stripping device, cutting mechanism for topping the canes arranged to one side of and above the level of the stripping device, and an inclined bar for guiding the canes laterally into and through the cutting mechanism and thence downwardly to a position in line with the stripping device, said bar having a guide notch at its lower end in which the canes slide while passing longitudinally through the stripping device.

3. In a stripping machine, a series of stripping devices arranged horizontally side by side, cutting mechanism for topping the canes arranged to one side of and above the level of the stripping devices, and an inclined bar for guiding the canes laterally into and through the cutting mechanism and thence downwardly to a position in line with the stripping device at one end of the series, said bar having a series of notches arranged horizontally at its lower end and spaced apart to correspond with the series of stripping devices.

4. In a stripping machine, a housing, spring-pressed blocks slidable in the housing, curved upper and lower stripping blades provided with lugs arranged lengthwise of them, and pins pivoting the said lugs to the said blocks and permitting the blades to tilt at an angle to each other, thereby forming a converging entrance for the canes.

5. In a stripping machine, a housing, spring-pressed blocks slidable in the housing, curved upper and lower stripping blades having inwardly offset portions at their front parts the end portions of which overlap when the blades are in the cutting position and which have sharp cutting edges at their front ends, said blades having lugs arranged lengthwise of them and to the rear of their inwardly offset front portions, and pins pivoting the said lugs to the said blocks.

6. In a stripping machine, a housing, spring-pressed blocks slidable in the housing, curved upper and lower stripping blades pivoted to the said blocks, and springs which normally hold said blades tilted at an angle to each other to present a converging passage for the canes to enter.

7. In a stripping machine, a housing, spring-pressed blocks slidable in the housing, curved upper and lower stripping blades pivoted to the said blocks and having rearwardly projecting lugs, and springs which normally hold the said blades tilted at an angle to each other, with the said lugs arranged in the path of the canes, the said blades being moved into cutting position when the canes thrust the said lugs apart.

8. In a stripping machine, a housing, spring-pressed blocks slidable in the housing, curved upper and lower stripping blades pivoted to the said blocks and provided with rearwardly projecting lugs having rounded ends, springs secured at one end to the housing and having rounded free end portions which engage with the rounded ends of the said lugs and normally hold the said blades tilted at an angle to each other with the said lugs in the path of the canes between the blades.

9. In a stripping machine, a housing, spring-pressed blocks slidable in the housing, curved upper and lower blades pivoted to the said blocks, said blades having inwardly offset portions at their front parts the end portions of which overlap each other when the blades are in the cutting position and which have sharp cutting edges at their front ends, and springs which normally hold the said blades tilted at an angle to each other with the cutting edges widely separated so that the canes are easily inserted between the blades.

In testimony whereof I have affixed my signature.

HENRY O. SCRANTON.